(12) United States Patent
Huisman

(10) Patent No.: US 7,086,693 B1
(45) Date of Patent: Aug. 8, 2006

(54) GLASS ROOF ASSEMBLY AND METHOD OF RETROFITTING A VEHICLE

(75) Inventor: George Huisman, Commerce Township, MI (US)

(73) Assignee: Classis Design Concepts, LLC, Walled Lake, MI (US)

( * ) Notice: Subject to any disclaimer, the term of this patent is extended or adjusted under 35 U.S.C. 154(b) by 0 days.

(21) Appl. No.: 11/247,063

(22) Filed: Oct. 11, 2005

(51) Int. Cl.
*B62D 25/06* (2006.01)

(52) U.S. Cl. .................... 296/215; 296/210; 296/146.1

(58) Field of Classification Search ............... 296/210, 296/211, 215, 214, 216.06, 216.07, 216.09, 296/146.1
See application file for complete search history.

(56) References Cited

U.S. PATENT DOCUMENTS

| | | | |
|---|---|---|---|
| 6,340,204 B1 * | 1/2002 | Seifert | 296/214 |
| 6,470,559 B1 * | 10/2002 | Spaulding et al. | 29/469.5 |
| 6,513,864 B1 * | 2/2003 | Bohm et al. | 296/214 |
| 6,848,739 B1 * | 2/2005 | Stallfort et al. | 296/215 |
| 6,971,704 B1 * | 12/2005 | Cocaign | 296/215 |
| 2005/0029839 A1 * | 2/2005 | Stemmer | 296/215 |
| 2005/0046240 A1 * | 3/2005 | Ozkok et al. | 296/210 |

FOREIGN PATENT DOCUMENTS

GB 2227431 A * 8/1990 .................. 296/215

* cited by examiner

*Primary Examiner*—Jason Morrow
(74) *Attorney, Agent, or Firm*—Quinn Law Group, PLLC; Christopher W. Quinn; Jean M. McCarthy

(57) ABSTRACT

A vehicle roof assembly is provided including a glass roof that has an outer surface, an opposing inner surface and edge surfaces defining a periphery therebetween. Trim members are configured to abut the edge surfaces when the glass roof is supported at the inner surface. The glass roof and trim members are preferably of sufficient size to extend from the front windshield to a rear window of the vehicle when the trim members abut the edge surfaces. Additionally, a method of retrofitting a vehicle is provided.

15 Claims, 4 Drawing Sheets

GLASS ROOF ASSEMBLY AND METHOD OF RETROFITTING A VEHICLE

TECHNICAL FIELD

The invention relates to a vehicle roof assembly including a glass roof and trim members; a method of retrofitting a vehicle with the roof assembly is also included.

BACKGROUND OF THE INVENTION

Vehicles are often provided with sunroofs either as an original equipment option or as a retrofitted add-on. Glass sunroofs typically occupy only a portion of the vehicle roof area with the structural roof (i.e., the load-bearing roof, whether steel or fiberglass) being visible around the sunroof. Sunroofs are often centered in the roof or are T-shaped. Sunroofs add style and value to a vehicle.

SUMMARY OF THE INVENTION

The invention provides a vehicle roof assembly including a glass roof and trim members that together extend from the front windshield to a rear window of a vehicle to provide a nearly continuous and flush glass appearance. The vehicle roof assembly preferably covers the entire structural roof, thus making the roof appear to be almost entirely glass from outside of the vehicle. However, structural integrity is not compromised. A method of installing a glass roof to achieve the nearly continuous glass appearance is also provided.

The vehicle roof assembly includes a glass roof that has an outer surface, an opposing inner surface and edge surfaces defining a periphery therebetween. Trim members abut the edge surfaces when the glass roof is supported at its inner surface by the vehicle roof structure, that is, by roof panel structure. By abutting the edge surfaces, the trim members present a flush roof assembly from the front windshield to the rear window of the vehicle. That is, the glass roof and the trim members are sufficiently sized to extend from the front windshield to the rear window.

A front trim member abuts a forward edge surface of the glass roof and partially overlays an outer surface of the front windshield. Similarly, a rear trim member partially overlays an outer surface of the rear window when it is positioned to abut the rearward edge surface. Side trim members abut opposing side edge surfaces while overlaying portions of the vehicle roof structure that supports the glass roof. Preferably, the side trim members include first side trim members for a first side of the vehicle such as the driver side. The first side trim members extend at least partially down the front windshield along the A-pillar of the vehicle and at least partially down the rear window along the C-pillar of the vehicle. Preferably, there are only two side trim members on each side of the vehicle and they extend to cover the entire length of the A and C pillars from a front fender to a rear quarter panel, for example.

Any of the trim members, but preferably the rear trim member, may include an illuminating member such as a light-emitting diode (LED). The illuminating member is operatively connected to a vehicle power source to provide illumination; for example to provide brake lights in the rear trim member.

The glass roof may include a glass inner panel, a glass outer panel and a barrier layer sandwiched therebetween. The barrier layer serves to at least partially obstruct light. The barrier layer may have a metallic appearance from an outward view of the vehicle. Because the trim members abut the glass roof to provide a relatively flush appearance, the added height above the existing roof structure (i.e., the non-glass, typically steel, vehicle roof structure) is not apparent to the observer.

In another aspect of the invention, the roof assembly may include a headliner that surrounds the roof opening and substantially covers an inner surface of the vehicle roof structure. The vehicle roof structure is thereby sandwiched between the glass roof and the headliner when the glass roof is supported by the roof structure.

A vehicle may be originally equipped or retrofitted with the vehicle roof assembly. A method of retrofitting a vehicle is made possible by the vehicle roof assembly. Specifically, the method includes cutting an opening in a vehicle roof and placing a glass roof on the vehicle roof over the opening so that the glass roof is supported by the vehicle roof. The method then includes abutting trim members against peripheral edge surfaces of the glass roof and adhering at least one of the trim members to the windshield of the vehicle and at least one other of the trim members to a rear window of the vehicle. The trim members thus provide a relatively flush appearance between the windshield, the glass roof and the rear window. Preferably, at least some of the abutted trim members extend along vehicle frame pillars. In this instance, the method further includes adhering these trim members to the vehicle frame pillars. To improve the aesthetic view from inside the vehicle, the method may include installing a headliner around the cut opening below the glass roof.

If the trim members are produced or manufactured to have illuminating electrical components such as LED lights, the method may include connecting wiring from the trim members to a wiring harness on the vehicle. The trim members are thereby connected with a vehicle power source.

The above features and advantages and other features and advantages of the present invention are readily apparent from the following detailed description of the best mode for carrying out the invention when taken in connection with the accompanying drawings.

DESCRIPTION OF THE PREFERRED EMBODIMENT

Figure 1:
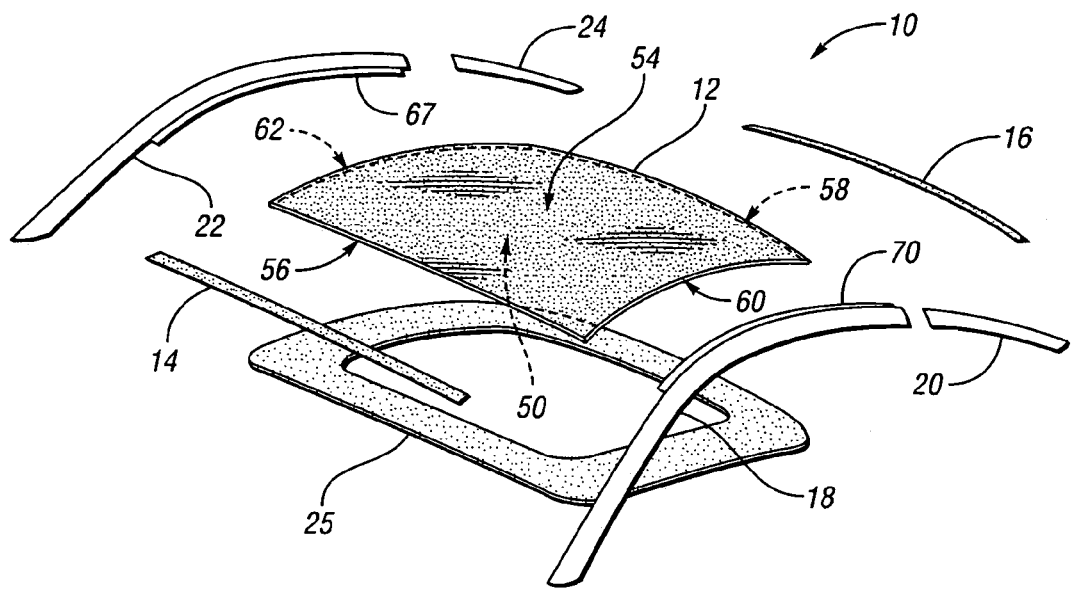
FIG. 1 is a schematic illustration in an exploded view of a vehicle roof assembly.

Referring to the drawings, where like reference numbers refer to like components, a vehicle roof assembly 10 is illustrated. Vehicle roof assembly 10 includes a glass roof 12 and a plurality of trim members. The trim members include a front trim member 14, a rear trim member 16, a forward first side trim member 18, also referred to herein as driver side A-pillar trim member, and a rearward first side trim member 20, also referred to herein as a driver side C-pillar trim member. Finally, the trim members include a forward second side trim member 22, also referred to herein as a passenger side A-pillar trim member, as well as a rearward second side trim member 24, also referred to herein as a passenger side C-pillar trim member. The vehicle roof assembly 10 also includes a headliner 25.

Figure 2:
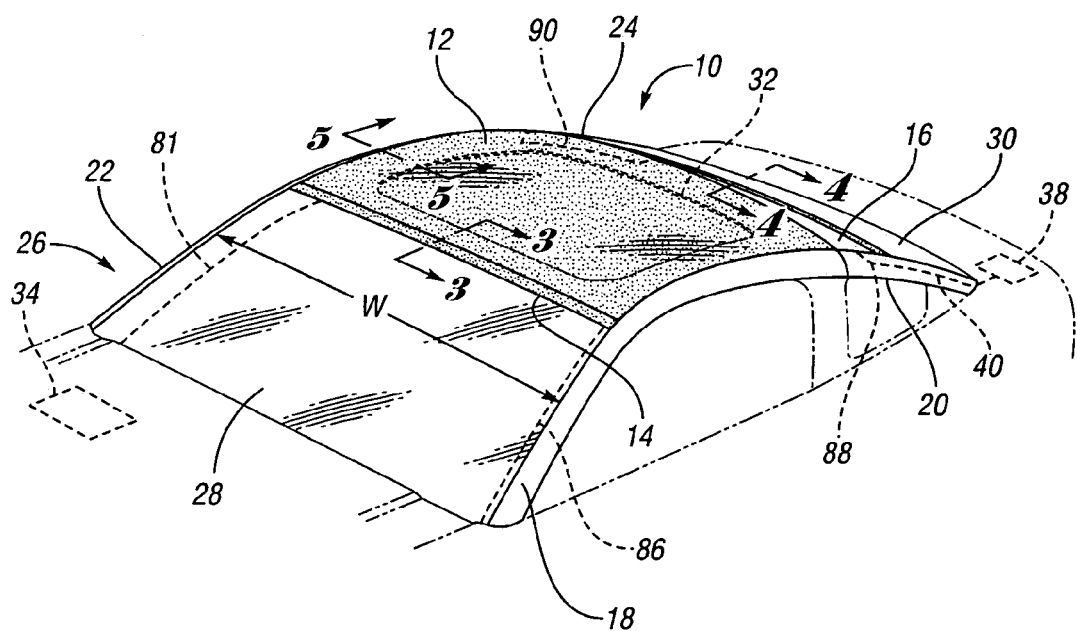
FIG. 2 is a vehicle with the vehicle roof assembly of FIG. 1 installed thereon.

Referring to FIG. 2, a vehicle 26 is depicted in partial fragmentary view with the vehicle roof assembly 10 of FIG. 1 installed thereon. As is typical, the vehicle 26 includes a front windshield 28 and a rear window 30. The glass roof 12 is supported around its perimeter by vehicle roof structure thereunder. The vehicle roof structure (not visible in FIG. 2, but discussed in detail with respect to FIGS. 3 through 5) has a roof opening cut therein. The roof opening is depicted by a dashed line 32. The roof opening 32 is formed by the vehicle roof structure shown in FIGS. 3 through 5 and may be cut if the vehicle 26 is retrofitted with the vehicle roof assembly 10. Also depicted in FIG. 2, the vehicle 26 includes a vehicle power source 34 such as a battery or an alternator which is connected via wiring and wiring harnesses (not shown) to a rear wiring harness 38 depicted generally in a rearward area of the vehicle, as is know in the art, for providing power to vehicle electric components in the rear area such as brake lights and trunk compartment illumination. Wiring 40 extends from the rear trim member 16 to the wiring harness 38, as will be discussed below in greater detail with respect to FIG. 4.

As is apparent in FIG. 2, the driver side A-pillar trim member 18 and C-pillar trim member 20 together extend from a lower portion of the front windshield 28 to a lower portion of the rear window 30 and, likewise, the passenger side A-pillar trim member 22 and the passenger C-pillar trim member 24 together extend from a lower portion of the front windshield 28 to a lower portion of the rear window 30. As is better illustrated in FIG. 3, the front trim member 14 is adhered to and partially overlays the front windshield 28 and abuts a forward edge surface 56 of the glass roof 12. The rear trim member 16 is adhered to and partially overlays the rear window 30 and abuts a rearward edge surface 58 of the glass roof 12. As shown in FIG. 2, the front trim member 14 abuts the A-pillar trim members 18 and 22, and extends substantially a width W of the windshield 28. Likewise, the rear trim member 16 extends to abut the C-pillar trim members 20 and 24. The trim members 14, 16, 18, 20, 22 and 24 are preferably a rigid urethane.

Figure 3:
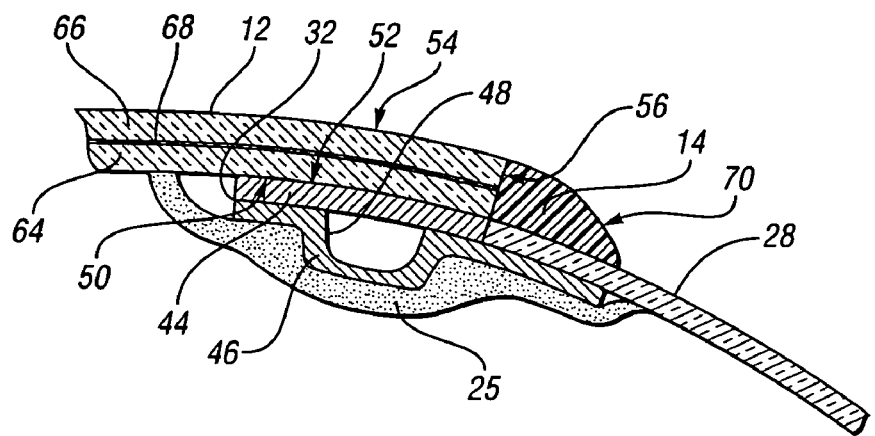
FIG. 3 is a schematic cross-sectional view taken at the arrows shown in FIG. 2 showing the vehicle roof assembly, vehicle roof structure, a front windshield and a headliner.

Referring to FIG. 3, vehicle roof structure includes a roof outer panel 44 and a roof inner panel 46. Other configurations of vehicle roof structures such as a single panel roof structure are also possible within the scope of the invention. The inner roof panel 46 is formed with reinforcing channel corrugation 48. The portion of the outer roof panel 44 and inner roof panel 46 shown in FIG. 3 may be referred to as the front roof header.

The glass roof 12 is partially supported by the vehicle roof structure 44, 46. Specifically, an inner surface 50 of the glass roof 12 is supported at an outer surface 52 of vehicle roof structure.

Referring again to FIG. 1, the glass roof 12 has an outer surface 54 as well as the opposing inner surface 50. Edge surfaces of the glass roof 12 define a periphery of the glass roof 12 and are located between the inner and outer surfaces 50, 54. A forward edge surface 56, a rearward edge surface 58, a first side surface 60 and a second side surface 62 together define the periphery of the glass roof 12.

Referring again to FIG. 3, it is apparent the glass roof 12 includes a glass inner panel 64, a glass outer panel 66 and a barrier layer 68 therebetween. The barrier layer 68 is preferably an ultraviolet barrier film which substantially blocks ultraviolet light rays from entering the interior compartment of the vehicle 26 of FIG. 2, such as a plastic interlayer sold under the trademark VANCEVA. Ultraviolet layers such as barrier layer 68 are known to be used in glass panels in commercial buildings. The barrier layer 68 is preferably a metallic color, giving the glass roof 12 a metallic look when viewed from outside of the vehicle, but still allowing occupants inside the vehicle 26 to see through the glass roof 12.

The glass inner panel 64, the glass outer panel 66 and the barrier layer 68 therebetween together form the forward edge surface 56. The front trim member 14 abuts the forward edge surface 56 and is preferably substantially the same height as the forward edge surface 56 to provide a substantially flush transition from the outer surface 54 of the glass roof 12 to an outer surface 70 of the front trim member 14. The front trim member 14 partially overlays the front windshield 28. The front trim member 14 is secured to the front windshield 28 by, for instance, an adhesive such as is commonly used to adhere a windshield to a vehicle or by double-sided tape. The glass roof 12 is supported by the inner roof panel 46 and the outer roof panel 44 and is secured to the outer roof panel 44 by a thin layer of adhesive that may encircle the entire opening 32 (adhesive not shown in FIGS. 3 and 4 but shown as adhesive 69 in FIG. 5). The headliner 25 is installed from inside the vehicle to substantially cover the vehicle roof structure 44 and 46 from view while leaving the view through the cut opening 32 unobstructed. Accordingly, an occupant within the vehicle will view the front windshield 28, the headliner 25 and the glass roof 12. The structure shown in the drawings is not necessarily scaled to actual size. For instance, the headliner 25 may be larger or smaller with respect to the vehicle roof structure (outer roof panel 44 and inner roof panel 46). Additionally the vehicle roof structure (outer roof panel 44 and inner roof panel 46) may be larger or smaller with respect to the trim members than as depicted.

Figure 4:
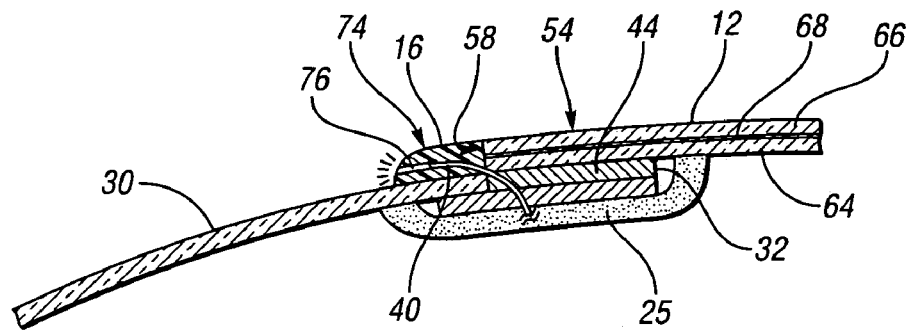
FIG. 4 is a schematic cross-sectional view taken at the arrows shown in FIG. 2 showing the vehicle roof assembly, vehicle roof structure, the headliner and a rear window, with an optional illuminating member within the rear trim member of the vehicle roof assembly.

Referring now to FIG. 4, the rear trim member 16 is shown abutting a rear edge surface 58 of the glass roof 12. The rear edge surface 58 is established by the stacked glass inner panel 64, glass outer panel 66 and barrier layer 68. The rear trim member 16 partially overlays the rear window 30. As with the front trim member 14, the rear trim member 16 is secured to the rear window 30 such as by using double-sided tape. The rear trim member 16 abuts the rearward edge surface 58 such that the outer surface 54 of the glass roof 12 is substantially flush with an outer surface 74 of the rear trim member 16.

Figure 6:
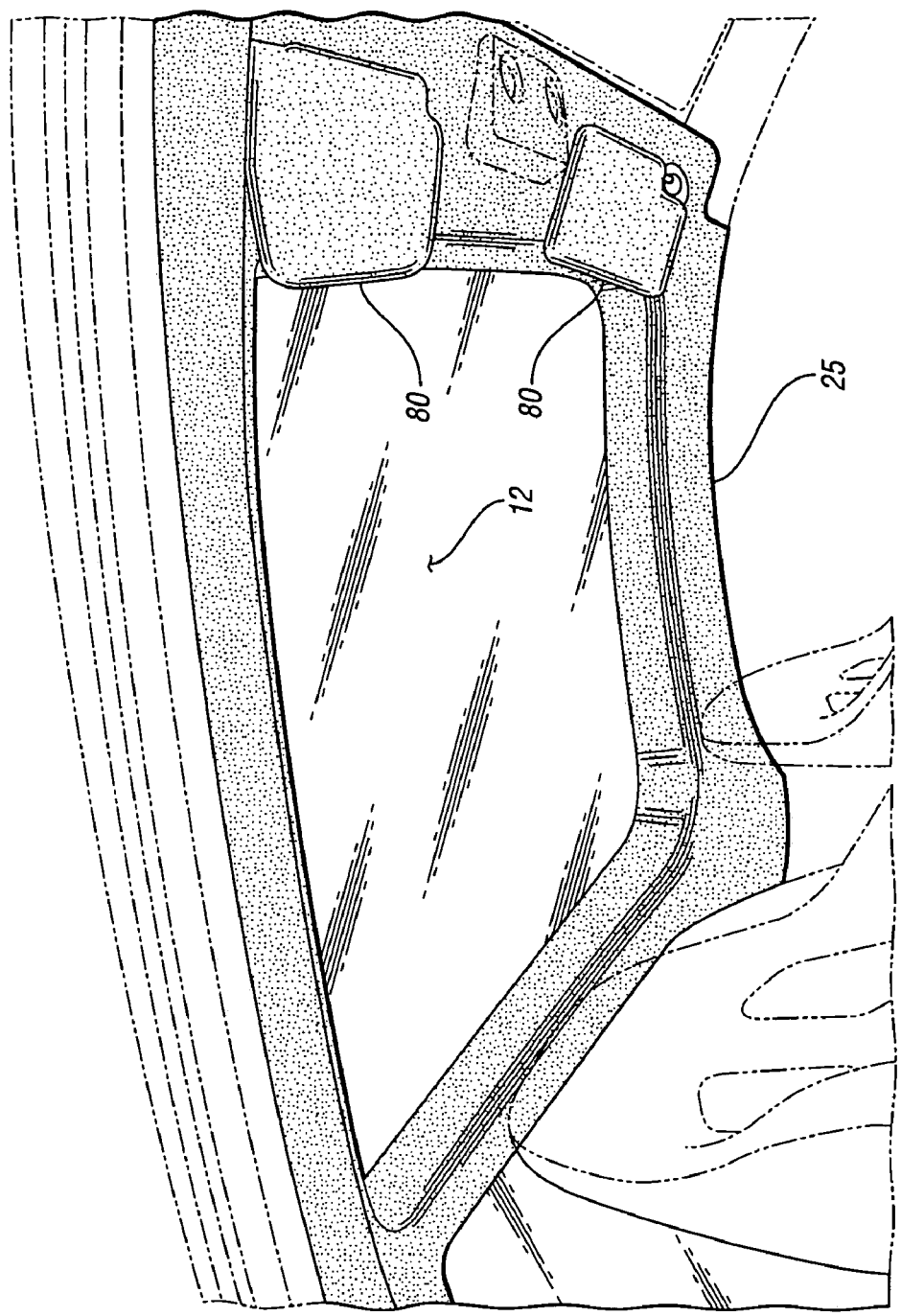
FIG. 6 is a schematic perspective illustration of the headliner and a glass roof included in the vehicle roof assembly of FIGS. 1 through 5.

The rear trim member 16 may contain an illuminating member such as an LED 76 therein. Preferably, a series of LEDs 76 are spaced to at least partially span the width of the rear trim member 16 above the rear window 30. Wiring 40 extends from the LEDs 76 and is operatively connected with rear wiring harness 38 of FIG. 2 which may be located in the trunk compartment behind vehicle seating. The rear wiring harness 38 is connected by other wiring (not shown) to the power source 34 shown in FIG. 2, such as by wiring extending along rocker panels as is known in the art. The wiring 40 may be routed through the outer and inner roof panels 44, 46, respectively, which may be referred to as the rear roof header in the area adjacent the rear window 30. Preferably, the same headliner 25 extends to substantially cover the rear roof header (i.e., the outer roof panel 44 and inner roof panel 46) in the area shown in FIG. 4. Referring to FIG. 6, the headliner 25 is preferably a one-piece component forming a generally rectangular boundary around the glass roof 12. Within the scope of the invention however, the headliner 25 may be one or more separate pieces. The headliner 25 illustrated in FIG. 6 is customized to receive vehicle interior components such as sun visors 80 which may mount to the headliner 25 or extend through to mount to the vehicle roof structure such as the inner roof panel 46. As is apparent from FIG. 6, vehicle occupants enjoy a panoramic view through the glass roof 12.

The roof opening 32 is cut to ensure the remaining inner roof panel 46 and outer roof panel 44 provide adequate vehicle integrity as well as support for the glass roof 12. Preferably all roof strengthening structure, such as the corrugation 48, is located near the outer perimeter of the roof structure (outer and inner roof panels 44, 46) and the center portion of the roof panels 44, 46 that is cut out and removed (if the vehicle 26 is retrofitted with the vehicle roof assembly 10) is comprised of relatively flat, sheet metal panels.

Figure 5:
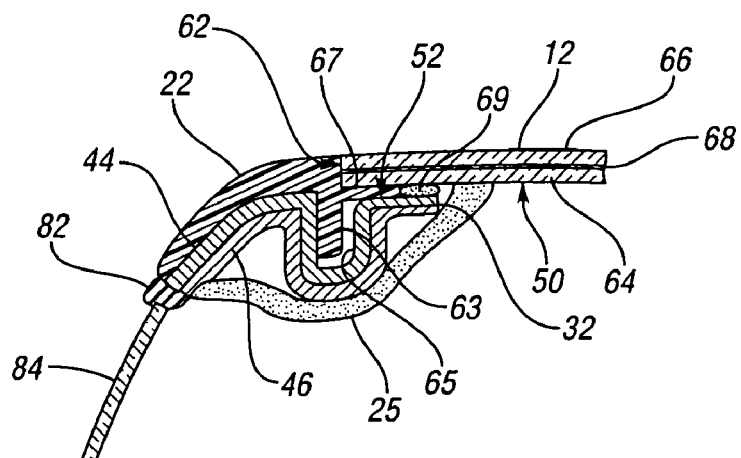
FIG. 5 is a schematic cross-sectional view taken at the arrows shown in FIG. 2 showing the vehicle roof assembly, roof structure, the headliner, a side window and a side trim member.

Referring now to FIG. 5, the outer roof panel 44 and inner roof panel 46 partially form a side pillar which extends forward to form an A-pillar 86 in FIG. 2 under the A-pillar trim member 18 and an A-pillar 81 under A-pillar trim member 22. The A-pillars 81, 86 may be referred to herein as vehicle frame pillars. As illustrated in FIG. 5, the outer and inner roof panels 44, 46 support the glass roof 12. Specifically, the outer surface 52 of the outer roof panel 44 supports the inner surface 50 of the glass roof 12. The edge surface 62 formed by the glass outer panel 66, barrier layer 68, and glass inner panel 64 is abutted by the passenger side A-pillar trim member 22. A flange portion 63 of trim member 22 extends into a drain channel 65 formed by the inner and outer roof panels 46, 44, respectively. Additionally, a spacer portion 67 of the trim member 22 extends between the glass roof 12 and the outer roof panel 44 and prevents an adhesive 69 from excessive thinning over the outer roof panel 44 when the glass panel 12 is placed over the adhesive 69 and the outer roof panel 44. The trim member 22 is secured to the outer roof panel 44 by any adequate securing means such as double-sided adhesive tape. The abutted A-pillar side trim member 22 and glass roof 12 substantially cover the vehicle roof structure 44, 46. The passenger side A-pillar trim member 22 extends to substantially meet with a window seal 82, sealing the top portion of passenger side window 84. Thus, the passenger side A-pillar trim member 22 affords a substantially flush exterior appearance to the vehicle by abutting the glass roof 12 to substantially cover the edge surface 62. The driver side A-pillar trim member 18 is secured to the vehicle roof structure 44, 46 and is a mirror image of the passenger side A-pillar trim member 22 shown in FIG. 5. For instance, the driver side A-pillar trim member 18 has a spacer portion 70 that serves the same function as spacer portion 67. Both spacer portions 67, 70 are visible on the respective trim members 22, 18 in FIG. 1. The driver side A-pillar trim member 18 also has a flange that is a mirror image of flange 63 of trim member 22, although neither of these flanges is visible in FIG. 1.

Referring again to FIG. 2, the driver side A-pillar trim member 18 substantially covers the driver side A-pillar 86 indicated thereunder by the dashed reference line. Additionally, the driver side trim member 20 substantially covers a C-pillar indicated by dashed line 88 thereunder. The driver side A-pillar trim member 18 abuts the driver side C-pillar trim member 20 to extend longitudinally together in uninterrupted fashion. A passenger side C-pillar trim member 24 likewise substantially covers a passenger side C-pillar indicated by dash line 90 in FIG. 2 and extends in substantially uninterrupted manner from passenger side A-pillar trim member 22. The C-pillars 88, 90 may be referred to herein as vehicle frame pillars.

Figure 7:
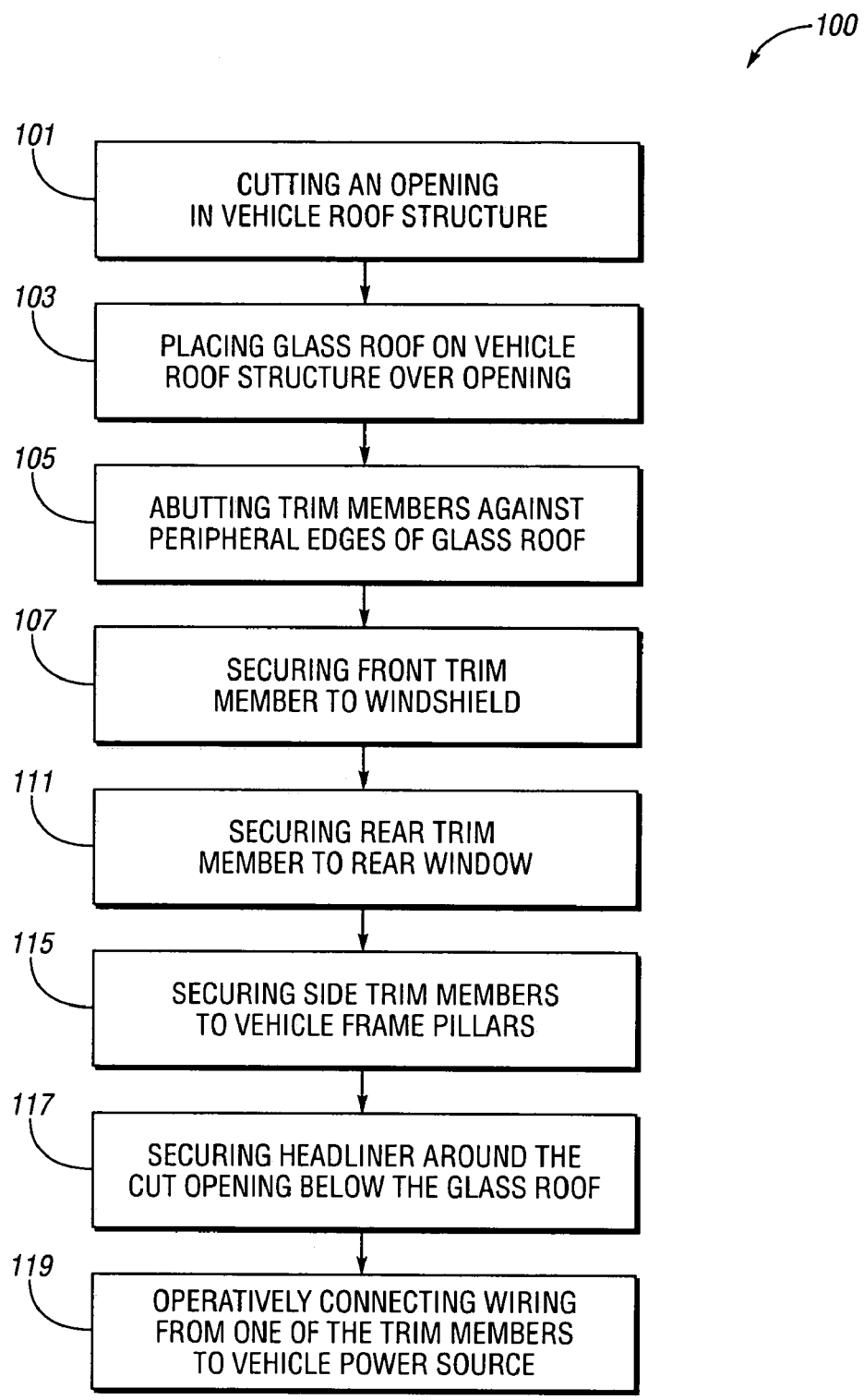
FIG. 7 is a flow chart illustrating a method of retrofitting a vehicle.

If the vehicle roof assembly 10 is to be installed on an existing vehicle (i.e., the vehicle is to be retrofitted with the vehicle roof assembly 10), a method of retrofitting the vehicle as described below may be employed. Within the scope of the invention, however, the vehicle roof assembly 10 may be incorporated in an originally manufactured vehicle. Assuming however that the vehicle roof assembly is retrofitted on to the vehicle 26, a method of retrofitting a vehicle is discussed with respect to the structure illustrated in FIGS. 1 though 6. However, the method may also be applied to other vehicle roof assembly embodiments. Referring to FIG. 7, a method 100 of retrofitting a vehicle 26 includes cutting an opening 32 in vehicle roof structure, step 101. After step 101, the method includes step 103, placing a glass roof on the vehicle roof structure over the opening. Thus, with reference to FIG. 2, the method includes placing the glass roof 12 on the vehicle roof structure (shown in FIG. 3 by outer and inner roof panels 44, 46, respectively) over the opening 32. Adhesive may be applied to the outer roof panel 44, preferably in a continuous bead encircling the cut opening 32, prior to placing the glass roof 12 on the outer roof panel 44. The method 100 also includes step 105, abutting trim members against peripheral edge surfaces of the glass roof 12. For instance, trim members 14, 16, 18, and 22 of FIG. 1 are abutted against edge surfaces 56, 58, 60 and 62, respectively, as illustrated in FIGS. 3 through 5. Side trim members 18, 22 may be positioned on the outer roof panel 44 prior to placing the glass roof 12 over the opening 32 and the outer roof panel 44 so that the spacers 69, 70, respectively, are sandwiched between the glass roof 12 and the outer roof panel 44, as illustrated in FIG. 5, and may prevent thinning of the adhesive 69. Although not in any particular order, and potentially accomplished with step 105, the method includes step 107, securing front trim member 14 to the windshield 28. This may be by adhering the front trim member 14 to the windshield 28 with adhesive cement. Similarly, the method includes step 111, securing rear trim member 16 to rear window 30. Again, the rear trim member 16 may be secured to the rear window 30 by adhesive such as double-sided adhesive tape. When the method 100 is performed through step 111, the vehicle 26 of FIG. 2 appears to have a substantially uninterrupted glass outer surface from the windshield 28 to the glass roof 12 and to the rear window 30.

The method 100 preferably also includes step 115, securing side trim members to vehicle frame pillars. For example, the A-pillar trim members 18 and 22 are secured not only to the vehicle roof structure (outer and inner roof panels 44, 46) as illustrated with respect to trim member 22 in FIG. 5, but also to vehicle A-pillars 86 and 81, respectively, represented in FIG. 2. Additionally, the C-pillar trim members 20 and 24 are adhered to the vehicle C-pillars represented by 88 and 90 in FIG. 2.

The method 100 may also include step 117, securing the headliner 25 around the cut opening 32 below the glass roof 12. Step 117 may be performed at any time after steps 101 and 103. Step 105 abutting the trim members against peripheral edge surfaces of the glass roof may be performed separately with respect to the various trim members. For instance, the front trim member 14 may be abutted in step 105 and secured in step 107 and then step 105 may be repeated with respect to the rear trim member 16, which is then secured to the rear window in step 111. Accordingly, the trim members need not all be abutted to the peripheral edge surfaces of the glass roof prior to securing any of the trim members. As discussed above with respect to FIG. 4, one or more of the trim members may have an illuminating member, such as rear trim member 16. Accordingly, in step 119, the method 100 may include operatively connecting wiring 40 from rear trim member 16 to a vehicle power source 34 (shown in FIG. 1) by connecting the wiring 40 to a rear wiring harness 38.

While the best mode for carrying out the invention has been described in detail, those familiar with the art to which this invention relates will recognize various alternative designs and embodiments for practicing the invention within the scope of the appended claims.

The invention claimed is:

1. A vehicle roof assembly comprising:
a glass roof having an outer surface, an opposing inner surface and edge surfaces defining a periphery therebetween;
trim members configured to abut the edge surfaces when the glass roof is supported at the inner surface;
the glass roof and trim members being of sufficient size to extend from a front windshield to a rear window of the vehicle when the trim members abut the edge surfaces; and
wherein the glass roof includes a glass inner panel, a glass outer panel and a barrier layer therebetween, the barrier layer at least partially obstructing light.

2. The vehicle roof assembly of claim 1, wherein the edge surfaces include a forward edge surface and an opposing rearward edge surface; wherein the trim members include a front trim member sized to partially overlay an outer surface of the windshield while abutting the forward edge surface; and
wherein the trim members include a rear trim member sized to partially overlay an outer surface of the rear window while abutting the rearward edge surface.

3. The vehicle roof assembly of claim 1, wherein at least one of the trim members contains an illuminating member illuminable by a vehicle power source.

4. The vehicle roof assembly of claim 1, wherein the edge surfaces include a first side surface and a second side surface opposing the first side surface, wherein the trim members include at least one first side trim member sized to partially overlay one portion of vehicle roof structure supporting the glass roof while abutting the first side surface and at least one second side trim member sized to partially overlay another portion of the vehicle roof structure supporting the glass roof while abutting the second side surface.

5. The vehicle roof assembly of claim 4, wherein at least one of said first and second side trim members includes a flange portion extending within a channel formed in the vehicle roof structure.

6. The vehicle roof structure of claim 4, wherein at least one of said first and second side trim members includes a spacer portion extending between the glass roof and the vehicle roof structure when the vehicle roof structure supports the glass roof.

7. The vehicle roof assembly of claim 4, wherein said at least one first side trim member is sized to extend at least partially down the windshield along an A-pillar of the vehicle and at least partially down the rear window along a C-pillar of the vehicle; and
wherein said at least one second side trim member is sized to extend at least partially down the windshield along an opposing A-pillar of the vehicle and at least partially down the rear window along an opposing C-pillar of the vehicle.

8. The roof assembly of claim 1, wherein the inner surface of the glass roof is supportable by an outer surface of vehicle roof structure surrounding and defining a roof opening, and further comprising:
a headliner configured to surround the roof opening and substantially cover an inner surface of the vehicle roof structure thereby sandwiching the vehicle roof structure between the glass roof and the headliner when the glass roof is supported by the roof structure.

9. A method of retrofitting a vehicle comprising:
cutting an opening in a vehicle roof;
placing a glass roof on the vehicle roof over the opening;
abutting trim members against peripheral edge surfaces of the glass roof; and
securing at least one of the abutted trim members to a windshield of the vehicle and at least one other of the abutted trim members to a rear window of the vehicle.

10. The method of claim 9, wherein at least some of the abutted trim members extend along vehicle frame pillars, and further comprising:
securing said at least some of the trim members to the vehicle frame pillars.

11. The method of claim 9, further comprising:
securing a headliner around the cut opening below the glass roof.

12. The method of claim 9, further comprising:
operatively connecting wiring from one of the trim members to a power source on the vehicle.

13. A vehicle comprising:
roof structure surrounding an opening therein;
a windshield and a rear window extending from the roof structure;
a glass roof overlaying the opening and having an outer surface, an inner surface and edge surfaces between the outer and inner surfaces defining a periphery, the glass roof being supported by the roof structure;
trim members abutting substantially all of the edge surfaces, including a front trim member adhered to an outer surface of the windshield and a rear trim member adhered to an outer surface of the rear window.

14. The vehicle of claim 13, wherein the vehicle includes A-pillars and C-pillars, wherein the first trim member extends substantially the width of the windshield;
wherein the trim members include a plurality of side trim members adhered to the roof structure, some of the side trim members extending along the A-pillars of the vehicle and some of the side trim members extending along the C-pillars of the vehicle; and
wherein the first trim member abuts the side trim members extending along the A-pillar.

15. The vehicle of claim 13, wherein the side trim members extend substantially the length of the A-pillars and the C-pillars.

* * * * *